Jan. 15, 1935. F. H. LAMB 1,987,688
LOGGING TRACTOR
Filed Dec. 11, 1931 3 Sheets-Sheet 2
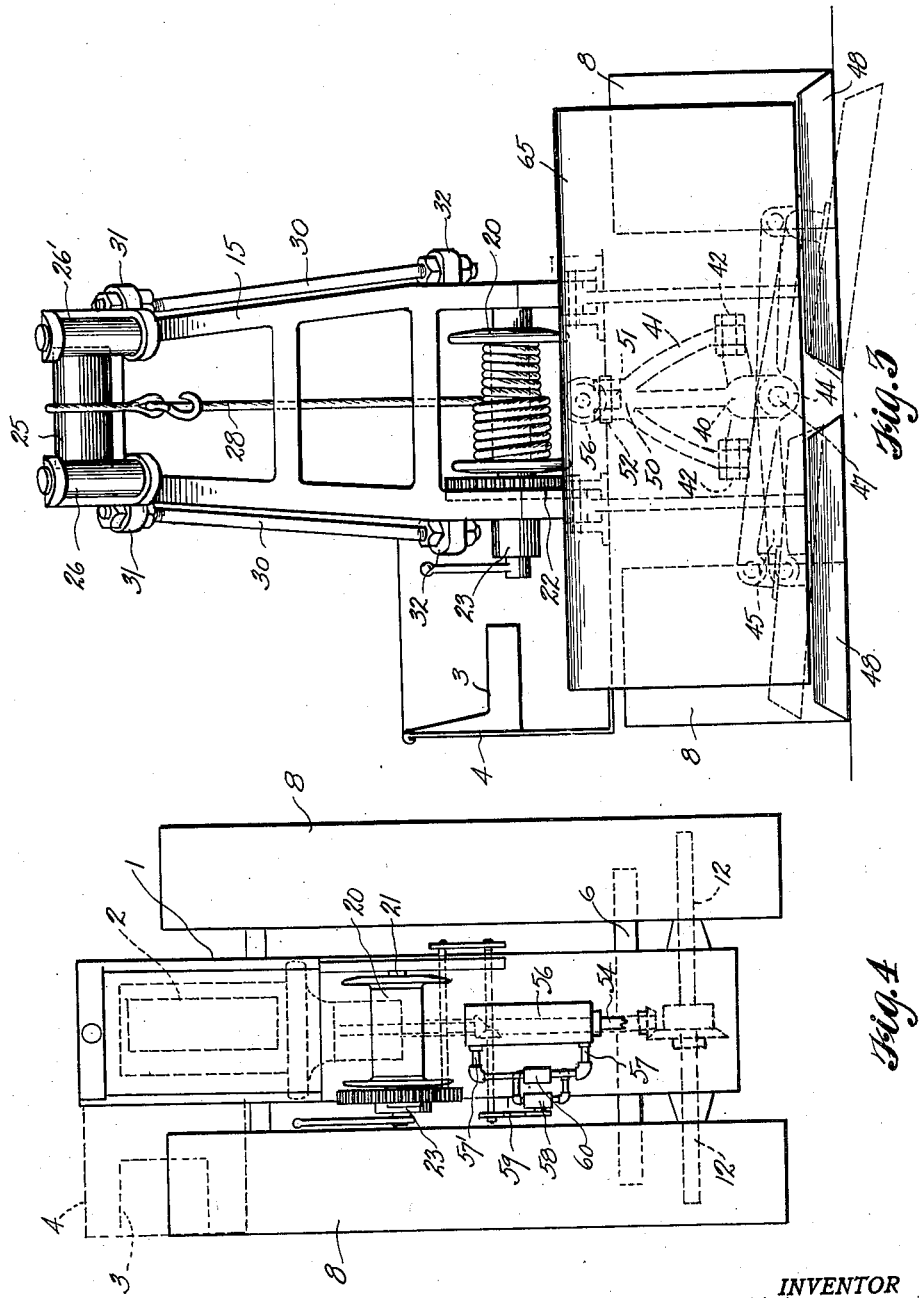
INVENTOR
FRANK H. LAMB
BY Cook + Robinson
ATTORNEY Jan. 15, 1935.  F. H. LAMB  1,987,688
LOGGING TRACTOR
Filed Dec. 11, 1931  3 Sheets-Sheet 3
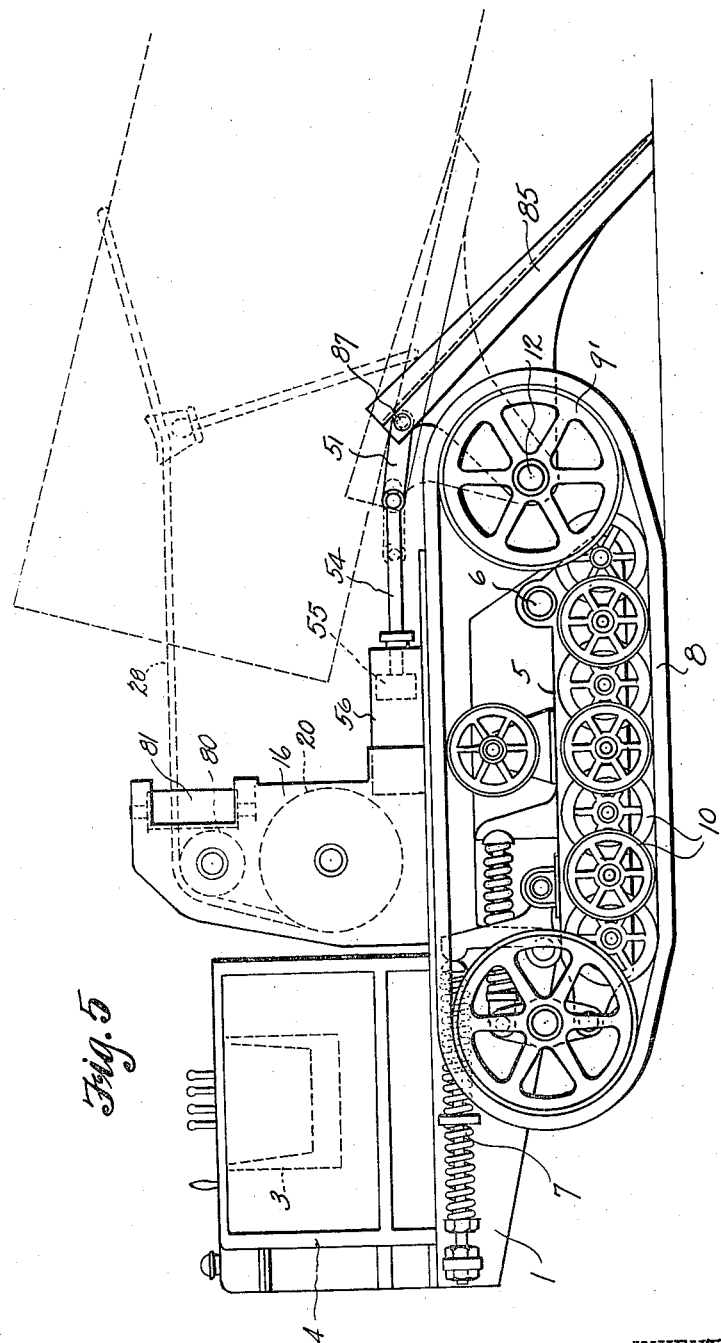
INVENTOR
FRANK H. LAMB
BY
Cook & Robinson
ATTORNEY Patented Jan. 15, 1935

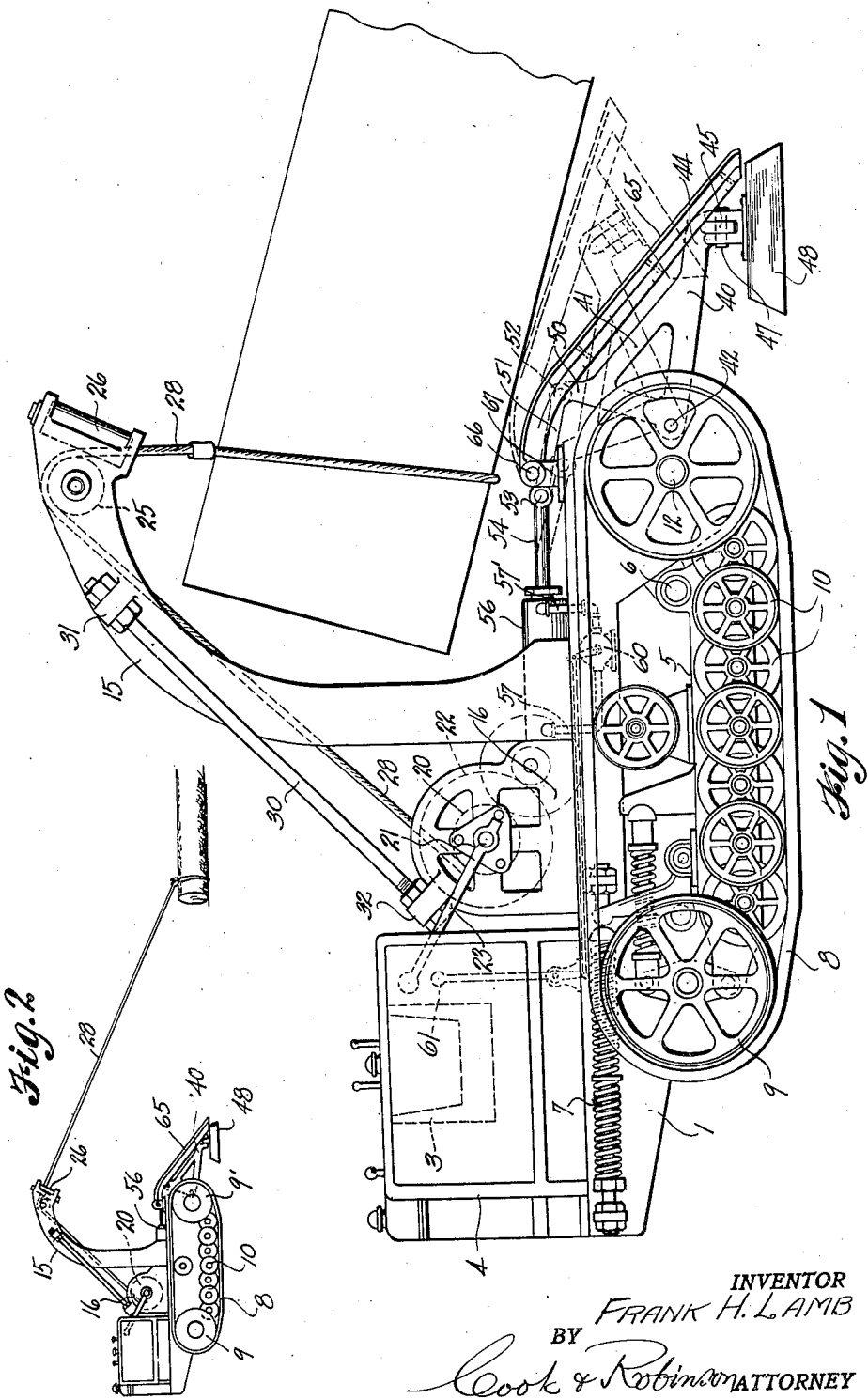

1,987,688

UNITED STATES PATENT OFFICE 1,987,688

LOGGING TRACTOR

Frank H. Lamb, Hoquiam, Wash.

Application December 11, 1931, Serial No. 580,401

11 Claims. (Cl. 214—65.3)

This invention relates to logging equipment and more particularly to a logging tractor including special equipment for skidding, yarding, transporting and other handling of logs; the machine being in the nature of a rapidly mobile power plant eminently suited to use in rough and heavily timbered country for the rapid handling and transporting of heavy logs and especially designed for a novel system of selective logging.

The principal object of this invention is to provide a tractor and equipment for the above stated purposes including an integral crane of the high arch type and a cable winding drum for the skidding, yarding and supporting of the logs for transportation and having also an auxiliary support associated with the tractor frame and adapted to be adjusted into use when needed for the purpose of extending the effective wheel base of the tractor and to thereby prevent tipping up of the tractor under heavy pull transmitted over the arch.

It is also an object of the invention to mount the auxiliary support in such manner and to so connect it with the power plant of the vehicle that it may be mechanically adjusted into and from functional position. Also, to provide automatically adjustable ground engaging supports for the outer end of the leg to adapt it to use on uneven ground.

It is another object of the invention to provide a skidding apron in connection with the auxiliary support useful in drawing logs up into the arch, and also for the support of logs while being transported.

Other objects of the invention reside in the details of construction of the various parts, in their combination and their mode of operation, as will hereinafter be described.

In accomplishing these and other objects of the invention, I have provided the improved details of construction, the preferred forms of which are illustrated in the accompanying drawings, wherein—

Fig. 1 is a side elevation of a logging tractor and equipment in its preferred form as embodied in the present invention.

Fig. 2 is a side view of the same on a reduced scale, showing the machine in use, and showing also the leg in its functional use.

Fig. 3 is a rear end elevation of the same.

Fig. 4 is a top or plan view of the tractor and equipment, the arch or crane being omitted for better illustration of other parts.

Fig. 5 is a view showing in side elevation a tractor with log loading means of an alternative construction.

Referring more in detail to the drawings—

Briefly described, the machine consists of a tractor of the track laying type on which is mounted a cable winding drum and a high arch, the latter being equipped with the necessary fair leads and rolls for guiding and confining a cable used with the drum. The cable drum is operatively connected with the engine or power plant of the machine and has the various reverse and forward speeds required and necessary brakes and clutches common to such equipment. The engine is located at one end of the tractor frame and the operator's position is along side of the engine and the various operating controls for the engine and equipment located so as to be easily accessible from this position.

The tractor, in a preferred form, comprises a main body frame 1, suitably constructed for the mounting of the engine and various other devices thereon. The engine, 2, outlined in dotted lines in Fig. 4, is mounted at what will be termed the forward end of the frame, and the operator's seat 3 is supported by a platform structure 4 along side of the engine above the level of the frame.

At opposite sides of the main frame, and extended lengthwise thereof, are track frames 5, supported pivotally at one end upon the opposite ends of a shaft 6 fixed transversely in the main frame, and yieldingly connected at their other ends by spring suspension means, indicated generally at 7, to give flexibility to the structure required for use on uneven ground. Endless track belts 8 operate about supporting and driving wheels 9—9' carried respectively at opposite ends of the frames and also against guide rollers 10 across the lower run of the track. In this construction the wheels 9' at opposite sides of the tractor are mounted on differential axle 12 and the axle is driven in the usual manner by any suitable connection with the engine.

Mounted upon the tractor frame 1 is a crane 15 of an open frame type of construction of suitable strength. This crane, which is a modification of the high arch, is made as a part of, or is fixed rigidly on the frame structure 16 of a hoist which is bolted or otherwise detachably fastened upon the tractor frame 1. As here shown, the hoist is located closely adjacent the engine, and the crane is as close thereto as practical in order to place its weight forwardly on the tractor and thereby to more effectively counter balance the pull over the arch incident to hauling in or transporting logs by the tractor.

The hoist includes a cable winding drum 20 mounted on a supporting and driving shaft 21 journaled in the frame 16 and driven by gearing of suitable character, as at 22, under control of a clutch mechanism as at 23. The crane standard extends vertically upward from the frame 16 and is then inclined rearwardly to centrally overlie the rear end of the tractor. A horizontal roll 25 is revolubly mounted in the crane near the end and fair lead rolls 26—26' are supported in spaced relation rearwardly of roll 25 for guiding the drum cable 28 across the roll 25 in passing to and from the drum.

To give strength and rigidity to the crane, a pair of brace rods 30—30 are arranged at opposite sides thereof which have their upper ends fixed in lugs 31 on the crane near its upper end and have their lower end fixed in lugs 32 on the frame 16 at opposite ends of the drum and rearwardly of the base of the crane.

In using the crane for hauling in, skidding or loading logs, the cable 28 would be extended from the drum 20 over the roll 25 and then between rolls 26—26' and connected with the log, in any suitable manner, or as seen in Fig. 2. Then the drum 20 is set in motion by the means provided to haul it in. Manifestly, the pull through the cable would have a tendency to tilt the forward end of the tractor upwardly and if the pull was sufficient, that is what would happen, but to prevent this undesirable result, I have provided an auxiliary, load sustaining means in the nature of a leg located at the rear end of the tractor frame and adjustable when needed into contact with the ground at some distance rearwardly of the tractor to thereby rigidly sustain the tractor against rearward tilting. This use of the leg, in fact, increases the effective wheel base of the tractor the extent of the leg.

As seen best in Figs. 1 and 3, the leg comprises a frame structure 40 of triangular form in side elevation and extending rearwardly from the tractor wall beyond the extent of the tracks. This leg includes spaced side frames 41—41 pivotally mounted on the rear end of the tractor frame by pivots 42 which extend through the frames and through lugs on the tractor frame; the line of the pivots being transversely of the tractor and approximately horizontally alined with the shaft 6. These frames 41—41 merge together at the rear end of the leg and form a support 44 within which a cross bar 45 is pivotally mounted, as at 47. This cross bar extends transversely of the longitudinal line of the tractor and has broad flat shoes 48—48 pivotally attached to its ends for supporting contact with the ground; the combined width of the shoes being substantially equal to the width of the tractor track.

The frames 41—41 also extend upwardly from the point of attachment with the tractor frame and continue in an arm 50 to which one end of a link 51 is pivotally attached by bolt 52; the other end of the link being attached pivotally as at 53 to the end of a piston rod 54 connected to piston 55 movable in a hydraulic cylinder 56. The cylinder 56 is fixed within the hoist frame 16 and has pipe connections 57 and 57' at its opposite ends leading to a pump 58 that is operable to deliver a liquid pressure medium from one end of the cylinder into the other to raise or lower the leg. The pump is driven by suitable connection with the hoist driving mechanism, such as by the belt 59 in Fig. 3; the direction of the pump being the same but the direction of flow controlled by a reversing valve 60 located in the piping system and under control of a hand lever 61. In this way the pump may be operated to raise or lower the leg and then by closing the valve against flow, the leg will be held positively at a set position.

Overlying the extension leg is an apron 65, and this comprises a flat plate secured upon a rigid frame made up of transverse and longitudinal beams. The apron has a transverse width substantially equal to that of the tractor and it is hingedly attached at its upper edge, as at 66, to the tractor frame by pivotally connecting the upper ends of some of its longitudinal supports to lugs 67 fixed on the tractor frame. The lower end of this apron is designed to rest upon the leg or cross bar and it is arched upwardly near its upper end so as to not interfere with action of the leg, and to guard the piston rod connection with the leg.

In the machine shown in Fig. 5, the high arch crane 15 of the device of Fig. 2 has been omitted and the frame structure of the hoist is modified. The hauling cable 28 is extended over a roll 80 mounted in the hoist frame just above the cable winding drum and it then passes between fair leads 81 which guide the cable to the drum when wound in. Also, a combination brace and apron 85 is employed in place of the leg 40 and apron 65 of Fig. 2. This is of an integral character and has supporting brackets arranged to pivot co-axially of the shaft 12. The lower end of the apron 85 is designed to rest directly upon the ground when in loading position and thus will serve as a brace or support to counteract the pull exerted by cable 28 in hauling in a load and will prevent rearward tilting of the tractor under heavy pull. It also will serve as a guide upon which logs may be skidded into loaded position.

The upper end of the apron, in this latter instance has pivotal connection, as at 87, with the end of the piston rod through the medium of the link 51 and it may be raised and lowered by use of the hydraulic cylinder 56 as in the previously described device. In loading a log, or logs, they are first drawn up onto the tractor then the apron is brought to its raised position, as shown in dotted lines, and there serves as a support for the ends of the logs, which are held in place by the taut cable.

Assuming that the tractor is equipped with devices as shown either in Fig. 1 or in Fig. 5, the use of the apron is similar in each instance. When loading is to be done, the first operation would be to properly line up the tractor with the direction of pull on the cable. The cable would then be extended to the log and secured thereto, as in Fig. 2. The extension leg and apron would then be lowered into contact with the ground and securely held there by closing the valve which controls the circulation of medium through the hydraulic cylinder. The closing of the valve locks the piston against movement in the cylinder and rigidly braces the leg. It is quite apparent that when the leg or apron is lowered into contact with the ground, this increases the effective wheel base of the tractor to the extent of the leg. With the extended leg thus supporting the tractor, it is practically impossible to tilt it rearwardly under normal or the ordinary pulls that are required to be carried either by the arch or by the loading drum. When the log is pulled in, the forward end will be brought into contact with the apron and will skid across the apron onto the truck. After a number of logs have been thus loaded, the apron may be raised to the dotted line position of Fig. 1, or the position shown in Fig. 5, and in this position it will support the logs for transportation. It is to be understood, however, that the logs are held in place by the cable 28 which is held under tension by its connection with the winding drum. In the device of Fig. 1 the cross bar 45 automatically compensates for unevenness in the ground level.

Having thus described my invention, what I claim as new therein and desire to secure by Letters Patent is:—

1. A logging tractor comprising a body frame structure, traction wheels therefor, a cable and winding gear therefor on the frame, a frame extension hingedly attached to the body frame and extended in its longitudinal direction, a cross bar pivotally mounted at the end of the extension frame, ground engaging pads at the ends of the cross bar and means for supporting the extension frame and pads clear of the ground and whereby they may be lowered against the ground and the extension rigidly held to counteract forces applied through the cable winding gear.

2. A logging tractor comprising a frame, traction wheels supporting the frame, cable winding gear on the frame, a frame extension hingedly attached to the body frame as an extension therefor and movable at its end against the ground to brace the frame counter to forces applied through the cable winding gear, means for holding the extension in a raised position and whereby it may be moved against the ground and held rigid relative to the body frame, and a skidding apron pivotally attached to the frame at its upper end and resting at its lower end on the leg, and adapted to be held by the leg, when the latter is free of the ground, in load sustaining position.

3. A logging tractor comprising a body frame structure, supporting treads therefor, a cable winding drum on the body frame, a boom overhanging the frame and provided with fair leads at its end within the vertical limits of the treads and a cable extended from the drum through the fair leads, an extension member hingedly attached to the rearward end of the body frame and means for supporting the extension in raised position and whereby it may be moved into contact with the ground and held rigid relative to the frame to brace the latter counter to the forces applied through the cable.

4. A tractor comprising a wheel supported fame structure, a cable winding means on the frame, a loading apron hingedly attached to the frame and adjustable against the ground to brace the frame counter to forces applied through the winding means, and mechanism attached to the frame and to the apron and operable to adjust the apron to different positions for bracing the tractor or for supporting a load thereon.

5. An automotive logging tractor comprising a frame, cable retaining means on the frame within the vertical limits of the tractor treads, a cable winding mechanism on the frame, a cable associated with the winding means and passing across the retaining means and whereby loads may be drawn in and held suspended for transportation from the retaining means, a frame extension adjustable into ground contact at a point substantially beyond the rearward limit of the tractor treads and means for holding the extension rigid relative to the tractor frame to counteract forces applied through the cable winding mechanism in its hauling in operation.

6. An automotive logging tractor comprising a frame structure, traction means therefor, a cable winding gear and fairlead secured on the frame within the limits of the traction means, a cable associated with the winding means and extended through the fairlead, and by means of which logs may be hauled in and held suspended from the fairlead for transportation, a frame extension pivotally fixed to the end of the frame, means for adjusting it into ground contact at a point substantially beyond the rearward limits of the traction means and for holding it rigid relative to the frame to counteract forces applied through the winding gear in loading, and for holding it free of the ground during travel of the tractor.

7. An automotive logging tractor comprising a frame, traction means therefor, a cable winding gear and fairlead mounted on the frame, within the rearward limits of the traction means, a cable extended from the winding gear across the fairlead for the hauling in of logs to the tractor and for suspending them from the fairlead for transportation, a frame extension adjustably attached to the tractor frame, means for moving it into ground contact at a point substantially rearward of the traction means and for holding it rigid relative to the frame to counteract loading forces applied through the cable and winding gear, and whereby the said extension may be raised clear of the ground and in position as a load support during travel of the vehicle.

8. An automotive logging tractor comprising a body frame, traction wheels, a cable winding drum on the frame, a cable associated therewith and extendable for the hauling in and loading of logs onto the tractor, a frame extension pivotally secured to the body frame, means for adjusting it to different positions into ground contact at a point substantially rearward of the wheels, and whereby it may be held rigid relative to the frame at any position of adjustment, and a skid plate associated with the extension for the skidding of logs onto the tractor by the winding in of the cable.

9. An automotive logging tractor comprising a body frame, traction wheels, a cable winding drum on the frame, a cable associated therewith and extendable for the hauling in and loading of logs onto the tractor, a frame extension pivotally secured to the body frame, means for adjusting the frame from a raised position to ground contacting position at a point substantially rearward of the wheels, and for rendering it rigid relative to the frame, and whereby it may be raised from the ground and held rigid relative to the frame at different positions of adjustment, and a skid plate overlying the extension for the skidding of logs onto the tractor by the cable and its winding means and adapted to serve as a load supporting bunk when the frame extension is raised.

10. A logging tractor comprising a frame structure, supporting treads therefor, a cable winding means on the frame, a loading skid hingedly attached to the frame, means for adjusting the skid against the ground and whereby it may be rendered rigid relative to the tractor frame at any position of adjustment and a cable on the winding means whereby loads may be drawn onto the tractor across the loading skid.

11. A logging tractor comprising a body frame structure, supporting treads therefor, a cable winding drum on the frame, a boom overhanging the frame and provided with fairleads at its end, a cable extended from the drum through the fairleads, an extension member hingedly attached to the rearward end of the body frame and means for supporting the extension in raised position and whereby it may be moved into bracing contact with the ground; said boom being mounted forwardly on the frame and having its upper end arched rearwardly to overlie the rearward end of the tractor frame, and providing an open space below it within which a load may be held suspended by the cable.

FRANK H. LAMB.